US010069859B2

(12) United States Patent
Andrews et al.

(10) Patent No.: US 10,069,859 B2
(45) Date of Patent: Sep. 4, 2018

(54) DISTRIBUTED RATE LIMITING

(71) Applicant: Verizon Digital Media Services Inc., Playa Vista, CA (US)

(72) Inventors: David Andrews, Los Angeles, CA (US); Reed Morrison, Torrance, CA (US); Derek Shiell, Los Angeles, CA (US); Robert J. Peters, Santa Monica, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 78 days.

(21) Appl. No.: 14/971,679

(22) Filed: Dec. 16, 2015

(65) Prior Publication Data

US 2017/0180414 A1    Jun. 22, 2017

(51) Int. Cl.
*H04L 29/06* (2006.01)
*H04L 29/08* (2006.01)

(52) U.S. Cl.
CPC ...... *H04L 63/1458* (2013.01); *H04L 63/1416* (2013.01); *H04L 63/1425* (2013.01); *H04L 67/10* (2013.01)

(58) Field of Classification Search
CPC ............. H04L 63/1458; H04L 63/1416; H04L 63/1425; H04L 67/10
USPC ......................................................... 726/23
See application file for complete search history.

(56) References Cited

U.S. PATENT DOCUMENTS

| | | | | |
|---|---|---|---|---|
| 7,222,185 B1 * | 5/2007 | Day | ...................... | H04L 12/185 370/432 |
| 7,234,168 B2 * | 6/2007 | Gupta | ..................... | G06F 21/55 705/51 |
| 7,389,537 B1 * | 6/2008 | Callon | .................... | H04L 47/10 713/153 |
| 7,426,634 B2 * | 9/2008 | Jain | ..................... | H04L 63/1458 709/224 |

(Continued)

FOREIGN PATENT DOCUMENTS

EP          0008862344 A2 *  9/1998  ............... H04Q 7/38

OTHER PUBLICATIONS

RockyKCChang-Defending against Flooding-based DDOS Attacks, Pub. dt: Oct. 2002.*

*Primary Examiner* — David Pearson
*Assistant Examiner* — Badri Champakesan
(74) *Attorney, Agent, or Firm* — Los Angeles Patent Group; Arman Katiraei

(57) ABSTRACT

Some embodiments provide distributed rate limiting to combat network based attacks launched against a distributed platform or customers thereof. The distributed rate limiting involves graduated monitoring to identify when an attack expands beyond a single server to other servers operating from within the same distributed platform distribution point, and when the attack further expands from one distributed platform distribution point to other distribution points. Once request rates across the distributed platform distribution points exceed a global threshold, a first set of attack protections are invoked across the distributed platform. Should request rates increase or continue to exceed the threshold, additional attack protections can be invoked. Distributed rate limiting allows any server within the distributed platform to assume command and control over the graduated (Continued)

monitoring as well as escalating the response to any identified attack.

16 Claims, 6 Drawing Sheets

(56) References Cited

U.S. PATENT DOCUMENTS

| | | | | |
|---|---|---|---|---|
| 7,542,478 B1* | 6/2009 | Ozer | | H04W 48/08 370/338 |
| 8,045,456 B1* | 10/2011 | Kondapalli | | H04L 47/10 370/229 |
| 8,493,847 B1* | 7/2013 | Kondapalli | | H04L 47/10 370/229 |
| 8,504,842 B1* | 8/2013 | Meacham | | G06F 3/0488 713/182 |
| 9,432,331 B1* | 8/2016 | Shavell | | H04L 63/02 |
| 9,654,483 B1* | 5/2017 | Benson | | H04L 63/108 |
| 9,699,211 B2* | 7/2017 | Jain | | H04L 63/1458 |
| 2005/0283530 A1* | 12/2005 | O'Neal | | H04L 12/1854 709/224 |
| 2006/0259607 A1* | 11/2006 | O'Neal | | H04L 12/1836 709/223 |
| 2008/0008094 A1* | 1/2008 | Gilfix | | H04L 67/322 370/235 |
| 2008/0063003 A1* | 3/2008 | O'Neal | | H04L 12/1854 370/408 |
| 2008/0225737 A1* | 9/2008 | Gong | | H04L 47/824 370/252 |
| 2009/0222907 A1* | 9/2009 | Guichard | | G06F 21/6227 726/17 |
| 2010/0260044 A1* | 10/2010 | Gormley | | H04L 47/10 370/230 |
| 2010/0278191 A1* | 11/2010 | Gupta | | H04L 63/1458 370/419 |
| 2011/0214157 A1* | 9/2011 | Korsunsky | | G06F 21/55 726/1 |
| 2012/0020244 A1* | 1/2012 | Bahr | | H04W 40/26 370/254 |
| 2013/0086679 A1* | 4/2013 | Beiter | | H04L 63/08 726/22 |
| 2013/0091241 A1* | 4/2013 | Goetz | | H04L 67/322 709/217 |
| 2013/0128731 A1* | 5/2013 | Bandlamudi | | H04L 47/19 370/230 |
| 2013/0205387 A1* | 8/2013 | Le | | G06F 21/316 726/19 |
| 2013/0298192 A1* | 11/2013 | Kumar | | G06F 21/52 726/3 |
| 2013/0332516 A1* | 12/2013 | Shah | | H04L 67/325 709/203 |
| 2014/0142984 A1* | 5/2014 | Wright | | G06F 19/321 705/3 |
| 2014/0164777 A1* | 6/2014 | Wielopolski | | H04L 9/0866 713/171 |
| 2014/0289813 A1* | 9/2014 | Nguyen | | G06F 21/10 726/4 |
| 2015/0026800 A1* | 1/2015 | Jain | | H04L 63/1458 726/22 |
| 2016/0080207 A1* | 3/2016 | Prakash | | H04L 69/16 370/231 |
| 2016/0134503 A1* | 5/2016 | Watson | | H04L 43/026 709/224 |
| 2016/0212158 A1* | 7/2016 | Gao | | H04L 63/1416 |
| 2016/0212165 A1* | 7/2016 | Singla | | G06F 21/577 |
| 2016/0292403 A1* | 10/2016 | Gong | | H04L 63/101 |
| 2017/0070510 A1* | 3/2017 | Ramalingam | | H04L 63/08 |

* cited by examiner

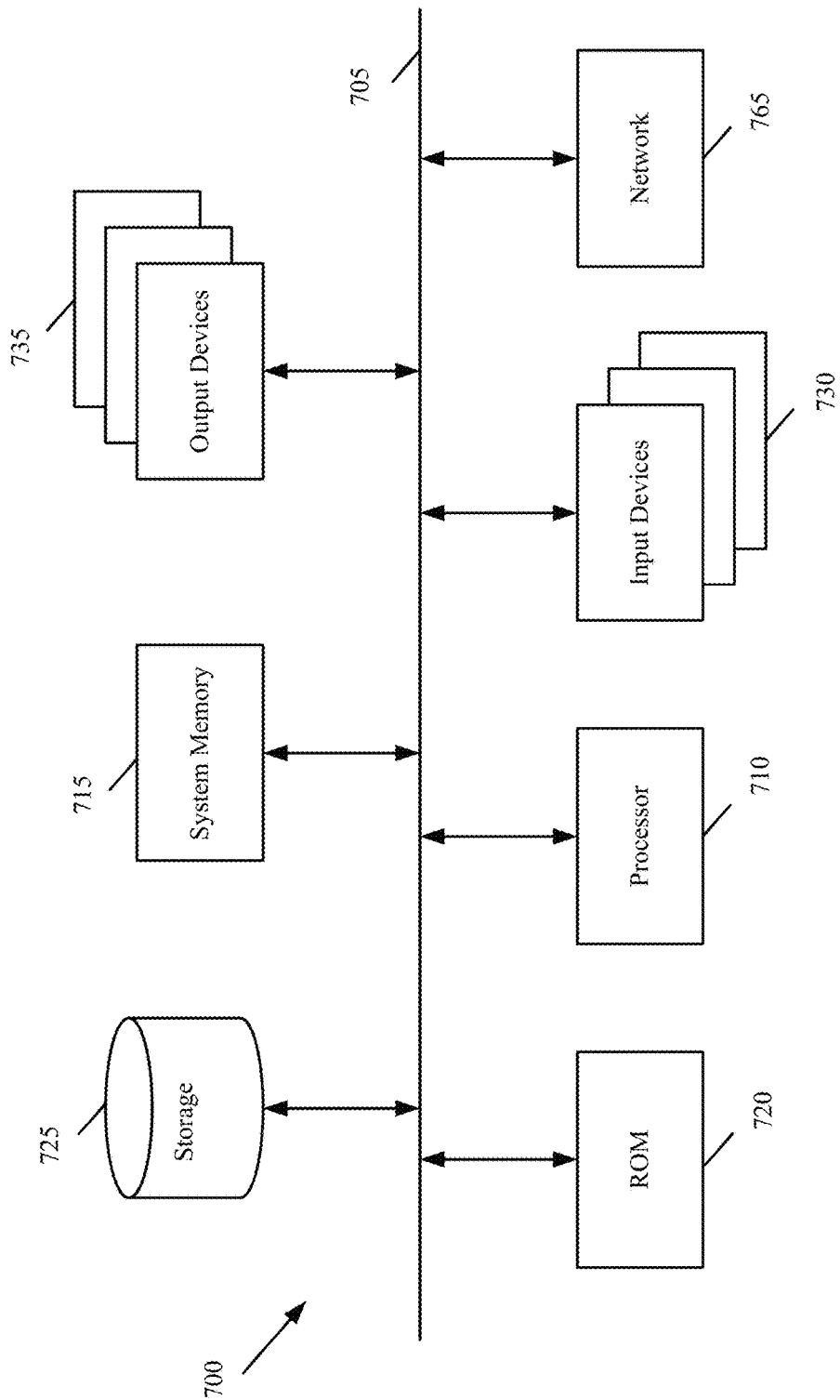

DISTRIBUTED RATE LIMITING

BACKGROUND ART

Some network based attacks attempt to flood servers with more requests than the servers are able to handle with the intention of causing the content and services hosted by the servers under attack to become unavailable to legitimate users. A distributed denial of service (DDoS) attack is an example of such an attack.

Distributed platforms have some level of built-in protection against these and other network based attacks. A distributed platform serves the same content and services from multiple servers operating at different distribution points. If one distribution point server comes under attack, servers from the same and other distribution points can continue to serve the content or services. The distribution points also shield an origin server from attack, wherein the origin server provides the distribution point servers with the content and services of one or more customers for distribution to end users. Content delivery networks (CDNs), cloud hosting providers, and other content or service providers that operate two or more distribution points are examples of distributed platforms.

The distributed platform redundancy is effective for small-scale DDoS attacks. However, the quantity and quality of such attacks is only increasing. Bot-nets from which many attacks originate are growing in size. Attacks involve more machines working in concert to simultaneously attack a target. Moreover, the involved machines have greater resources (e.g., processing power and network bandwidth), thereby allowing each machine to issue more requests and place greater burden on the target.

Large scale attacks can degrade distributed platform performance in multiple ways. The attack can spill over from one distributed platform server where the targeted content and services are available to other servers, until the entire distributed platform is overwhelmed. Legitimate users seeking the same content or service from a distributed platform under attack will experience delayed server response and may even receive no server response when an attack outpaces the ability of the distributed platform servers to respond to the quantity of inbound requests. This is especially problematic for a CDN, whereby each distribution point of the CDN is tasked with delivering the content and services of several different customers. If an attack is launched against a single customer and the attack overwhelms the CDN, then content and service distribution for all CDN customers can be disrupted. In other words, an attack against one distributed platform customer can impact content and service delivery for all distributed platform customers. Large scale attacks can also affect origin server performance, which in turn degrades distributed platform performance. Requests for dynamic content or other content that is not or cannot be cached by the distribution point servers of the distributed platform servers propagate from the distribution point servers to the origin server. Even though the distribution point servers can keep pace with the attacking request load, the origin server may not. Consequently, the origin server is unable to respond to forwarded requests from the distribution point servers, which prevents the distribution point servers from responding to the receiving requests, including those from legitimate users.

Accordingly, there is a need for distributed platforms to be able to quickly respond to network based attacks in order to mitigate attack impact across different distribution points of the distributed platform as well as the origin servers sourcing the content and services that are distributed by the distributed platform. More generally, there is a need to prevent an attack from scaling to the point at which it can interrupt content and service delivery operation of the distributed platform and the origin servers shielded by the distribution platform. To this end, there is a need to not only identify loads across individual servers, but also appreciate how those loads can affect, in the aggregate, performance of different distribution points, origin servers, and the entire distributed platform. There is further a need to then scale protections against network based attacks in proportion with the scale of the attack on the distributed platform to ensure continued operation of the distributed platform and origin servers even in the face of increasingly large network based attacks.

BRIEF DESCRIPTION OF THE DRAWINGS

A preferred embodiment of methods and systems for distributed platform rate limiting will now be described, by way of example only, with reference to the accompanying drawings in which:

FIG. 7 illustrates a computer system or server with which some embodiments are implemented.

DETAILED DESCRIPTION

Some embodiments provide distributed rate limiting to combat distributed denial of service (DDoS) and other large-scale network based attacks launched against a distributed platform. The distributed rate limiting ensures continued operation of the distributed platform as the attack spills over from one distributed platform server to multiple servers. The distributed rate limiting further ensures continued operation of the origin servers sourcing the distributed platform content and services as origin server loads increase due to increased injection of malicious attack traffic. The distributed rate limiting provides a low latency mechanism for obtaining an expanding, and ultimately global, view of request rates throughout the distributed platform and for proportionally scaling attack protections in response to abnormal request rates that indicate attacks being launched against the distributed platform.

As part of distributed rate limiting, each server within a distribution point of the distributed platform is configured to monitor request rates for content or services served by the server. Should the server request rate at a particular server exceed a server level threshold, messaging is exchanged with other servers in the same distribution point as the particular server to monitor request rates for the entire distribution point. Should the distribution point request rate exceed a distribution point level threshold, messaging is exchanged with other distribution points to monitor request rates across the distributed platform. Should the distributed platform request rate exceed a global threshold, messaging is exchanged to cause the servers to limit request rates, thereby limiting the affect of any attack on the distributed platform and origin servers. In some embodiments, distributed rate limiting takes an escalating approach to limiting request rates across the distributed platform servers in proportion to the escalation of request rates.

The distributed rate limiting is a decentralized methodology that allows any server of the distributed platform to assume command and control over scaling the request rate monitoring as well as the attack protections that other servers or distribution points of the distributed platform perform. In other words, any distributed platform server that comes under attack can initiate the protocol for escalating the analysis of request rates across the server distribution point and other distribution points and for escalating the corrective action taken by other affected servers or distribution sites. This allows the distributed platform to identify and respond to an attack in as little as a few seconds of the attack commencement. In doing so, the distributed platform can prevent an attack from reaching the point it overwhelms either the distributed platform or origin servers sourcing the content and services for distribution by the distributed platform.

Figure 1:
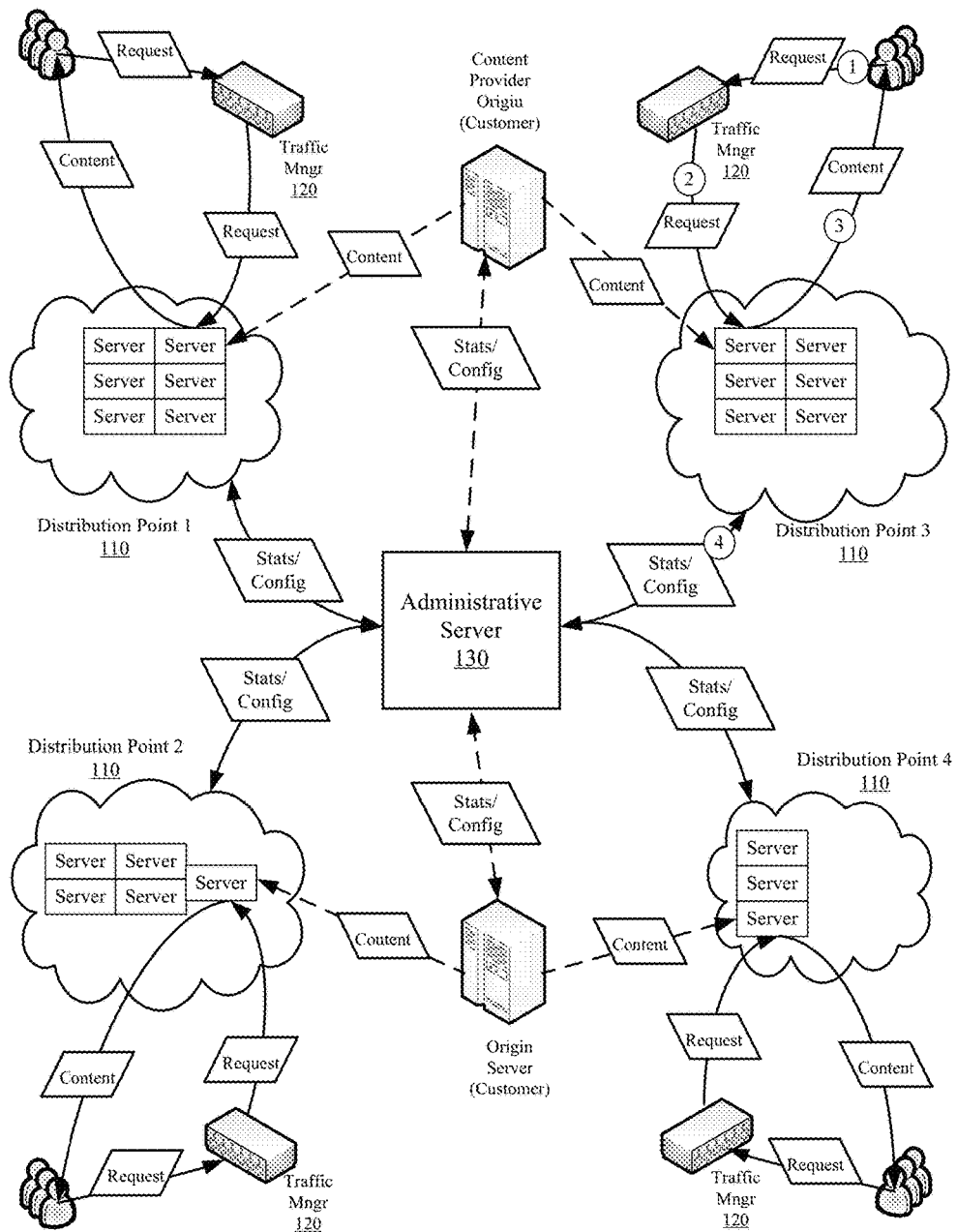
FIG. 1 presents an exemplary distributed platform architecture for implementing the distributed rate limiting of some embodiments

To facilitate the discussion, FIG. 1 presents an exemplary distributed platform architecture for implementing the distributed rate limiting of some embodiments. The distributed platform is shown to include distribution points 110, traffic management servers 120, and an administrative server 130. The figure illustrates the interactions that distributed platform customers, including content and service providers and origin server operators, have with the distributed platform as well as the interactions that users, including content or service consumers, have with the distributed platform.

The FIG. 1 distributed platform can be operated as a content delivery network (CDN). In the context of a CDN, each distribution point 110 represents a different point-of-presence (PoP). The distribution points 110 are usually located at different edges of the Internet or other large network infrastructure. The distribution points 110 are geographically separated from one another. Each distribution point 110 includes one or more servers and may further include other machines such as load balancers (not shown).

Each distribution point 110 server can represent a separate physical machine or a set of virtual machines running on a partitioned or shared set of resources of a physical machine. Multiple servers may be deployed onto the hardware resources of a single physical machine.

The distribution point 110 servers are tasked with delivery of services and/or content of one or more third party customers of the distributed platform to end users that request the services or content from the distributed platform. In response to an initial request for particular content or a particular service, a distribution point server receiving the request establishes a connection to an origin server operated by the content or service provider. The distribution point server retrieves a copy of the requested content or service from the origin sever over the established connection. The distribution point server then passes the retrieved content or service to the requesting end user and, if possible, locally caches a copy so that subsequent requests for the same content or service can be served from cache without accessing the origin server. It should be noted that certain dynamic or custom content or services cannot be cached and each request for such content or services may trigger a retrieval back to the origin server. Attacks directed to uncacheable dynamic or custom content or services are especially problematic because the manageable load is not what the distribution points 110 can support, but the load the content or service provider origin server can support. As noted above, the distributed rate limiting ensures continued operation of the distributed platform as well as the origin servers. To do so, the distributed rate limiting thresholds can be set according to request rates supported by the various origin servers.

The traffic management servers 120 route users, and more specifically, user issued requests for services or content to one of the distribution points 110 that can optimally deliver the requested service or content back to the requesting user. Different implementations utilize different traffic management schemes, such as Anycast routing or Domain Name System (DNS) routing, to achieve such routing. The traffic management server 120 operation can therefore facilitate failover and redundancy. However, such operation can also enable attacks from spilling-over from one distribution point to another.

The administrative server 130 may include a central server of the distributed platform or a distributed set of interoperating servers that perform the configuration control and reporting function of the distributed platform. Service provider and content providers register with the administrative server 130 in order to designate and offload their services and content to the distributed platform for distribution through the distribution points 110. In some embodiments, the designation includes identifying one or more origin servers from which the distribution point 110 servers source and distribute the customer's services or content.

The distributed rate limiting integrates into such a distributed platform by configuring and modifying distribution point server operation. This involves configuring the servers with different monitoring escalation thresholds, different escalating attack protections, and addressing of servers within the same distribution point and other distribution points. The modified server operation leverages the configured thresholds, attack protection, and addressing to produce an expanding, and ultimately global, view of request rates across the distributed platform and to limit request rates upon identification of an attack. Distributed rate limiting further involves configuring the servers with specialized and secure messaging for signaling the monitoring and attack protection escalations.

In some embodiments, distributed rate limiting involves configuring different thresholds at the server level, distribution point level, and global level. Additional or alternative levels can be defined as desired. For example, thresholds can be defined in between the individual distribution point level and the global level to introduce thresholds for regional distribution points.

Multiple thresholds can be set at each level to provide for multiple escalations at each level. For example, a first global threshold can trigger the distributed platform servers to perform a first attack protection and a second global threshold can trigger the distributed platform servers to perform a different second attack protection. Also as will be described below, multiple thresholds can also be set at each level. Multiple thresholds can be used to monitor different request rates directed to different content or services, monitor request rates of requests that are directed to different origin servers, monitor requests rates from different users or sets of users, or monitor how request rates impact different server resources (e.g., processor, memory, and network bandwidth).

The thresholds define the monitoring criteria by which the servers determine if demand exceeds acceptable limits, wherein demand in excess of the acceptable limits indicates the possibility of the servers coming under attack. The server thresholds can be defined according to any of several parameters that the servers monitor. In preferred embodiments, the thresholds are defined based on request rates.

Request rates can be calculated from the number of requests a server receives during some defined interval (e.g., five seconds). In some embodiments, the request rate monitoring is performed granularly at the content or service level or at the requestor level. In some such embodiments, different request rates are calculated based on the number of requests that are directed to each unique content or service served from the distributed platform or the number of requests that are directed to each Uniform Resource Locator (URL) or domain name used in requesting content or services from the distributed platform. In these cases, the thresholds identify attacks that target specific content or services. In some other embodiments, different request rates are calculated based on the number of requests originating from unique Internet Protocol (IP) addresses, IP address blocks, IP subnets, or Autonomous Systems. In these cases, the thresholds identify attacks originating from specific users, set of users, or regions. The thresholds can also be defined in terms of server resources. Resource defined thresholds can be based on server CPU utilization rates or network bandwidth utilization rates as some examples.

This granular monitoring allows different thresholds to be defined for different content, services, IP addresses, URLs, domain names, etc. The different thresholds reflect the different demand that the distributed platform expects for different content and services as well as the different demand the distributed platform expects to receive from users operating in different regions. The different thresholds allow the distributed platform to better detect anomalous request rates that are indicative of an attack. For example, the distributed platform may be tasked with delivering a first live stream of the Superbowl and a second live stream of a local news feed. The first live stream will experience significantly greater demand than the second live stream. Accordingly, different thresholds are set for each of the first and second live streams. The different thresholds set different request rates for determining when the first live stream and when the second live stream are experiencing anomalous request rates. Similarly, different thresholds can be set for different IP addresses, address blocks, or subnets to reflect the different demand that the distributed platform expects from different regions. For example, the distributed platform may expect 10,000 requests per second from United States based users and 1,000 requests per second from China based users. Different thresholds are configured for the IP addresses of the United States based users than the China based users. Accordingly, when the request rate from China based IP addresses exceeds 1,000 requests per second, the threshold configured for China based IP addresses will be triggered, but if the request rate from United States based IP addresses exceeds 1,000 requests per second but remains below 10,000 requests per second, the threshold configured for United States based IP addresses will not be triggered.

It is important to note that the thresholds are defined to trigger prior to any of the servers becoming saturated. In other words, an attack is identified before the attack can cause server performance degradation.

Figure 2:
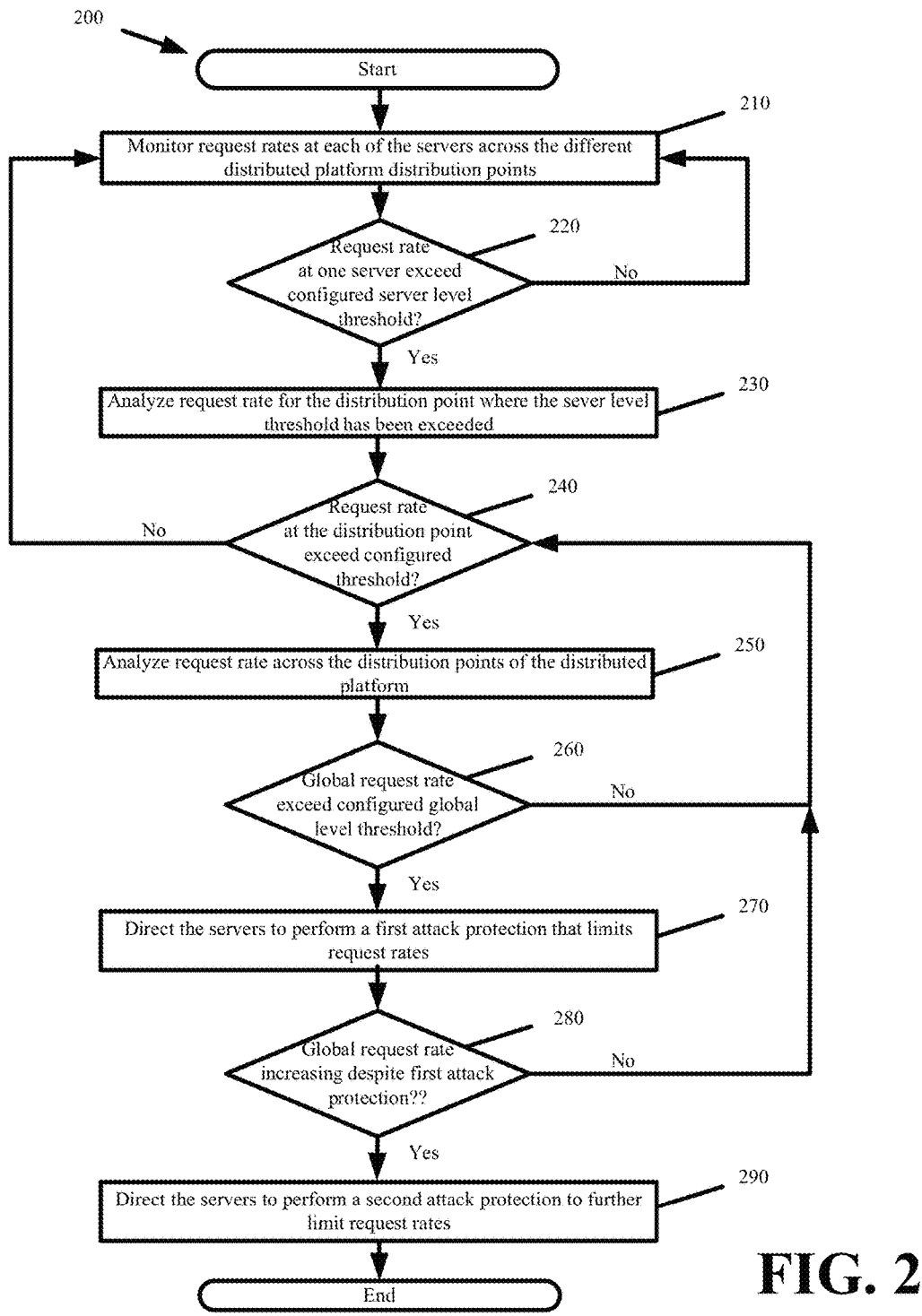
FIG. 2 presents a process for identifying attacks using the graduated approach in accordance with distributed rate limiting of some embodiments

In some embodiments, server operation is modified to use the thresholds configured at the different distributed platform levels as part of a graduated approach to attack identification. As noted above, some embodiments configure thresholds at the server level, distribution point level, and global level, although multiple thresholds can be configured at each level and additional levels can be defined. FIG. 2 presents a process 200 for identifying attacks using the graduated approach in accordance with distributed rate limiting of some embodiments.

Process 200 commences by monitoring (at 210) request rates at each of the servers across the different distributed platform distribution points. Each server monitors its own request rate(s) based on user requests that are routed to the server. The monitoring continues until the request rate at a first server exceeds (at 220) a server level threshold that is configured on the first server.

Once the request rate at the first server exceeds the configured server level threshold, the process graduates the monitoring to the distribution point level. Specifically, the process next analyzes (at 230) the request rate for the distribution point in which the first server operates. In some embodiments, analyzing the distribution point request rate involves requesting, receiving, and aggregating the request rates from each server in the distribution point. In some other embodiments, analyzing the distribution point request rates involves monitoring and aggregating the request rate experienced by all servers in the distribution point. If the exceeded server level threshold is specific to particular content or one or more specific IP addresses, step 230 can be modified so as to analyze the aggregate request rate at the distribution point for the same particular content or same one or more IP addresses. As an example, if the request rate for "example.com/movie.flv" exceeds the configured server level threshold, the distribution point monitoring will aggregate the request rate for "example.com/movie.flv" at each server of the distribution point. In this example, the distribution point monitoring will not account for request rates for other content. As a different example, if the request rate for all requests received by a given server exceeds the configured server level threshold, the distribution point monitoring will then aggregate the request rate for all incoming requests received by all servers within the same distribution point.

Figure 3:
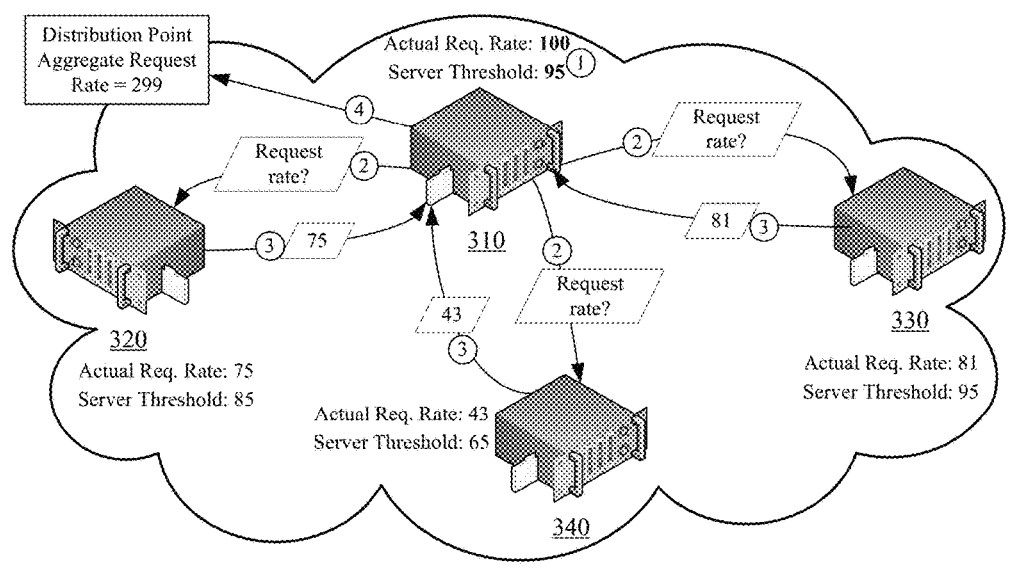
FIG. 3 illustrates a first approach to distribution point monitoring in accordance with some embodiments.
Figure 4:
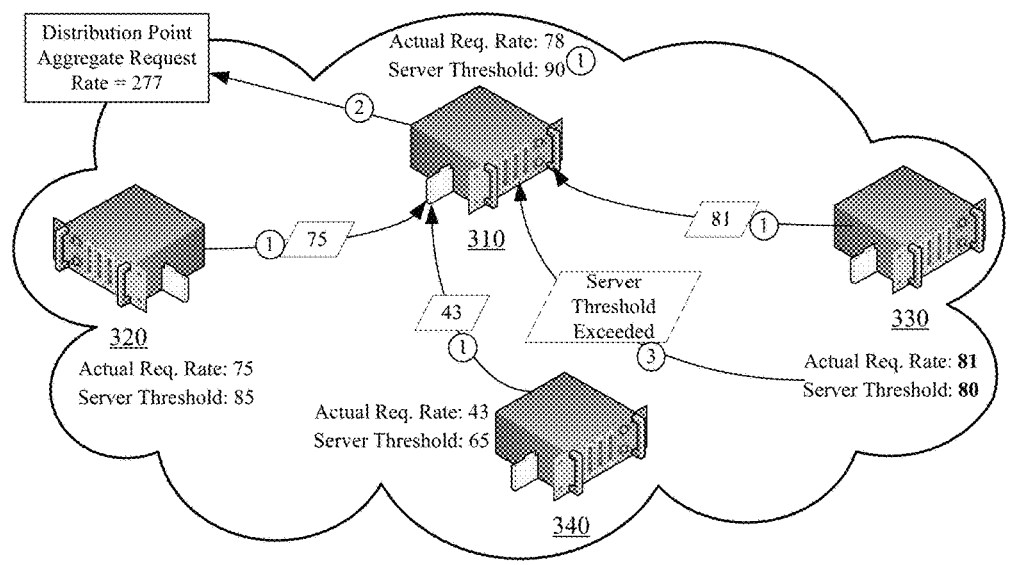
FIG. 4 illustrates a second approach to distribution point monitoring in accordance with some embodiments FIG. 5 conceptually illustrates global request rate monitoring in accordance with some embodiments.

FIG. 3 illustrates a first approach to distribution point monitoring and FIG. 4 illustrates a second approach to distribution point monitoring in accordance with distributed rate limiting of some embodiments. FIG. 3 illustrates four servers 310, 320, 330, and 340 operating in the same distribution point. The actual request rate monitored by each server 310, 320, 330, and 340 as well as the configured server level threshold are shown for each server 310, 320, 330, and 340. In this figure, the request rate at server 310 exceeds the configured server level threshold. In response, server 310 issues a request for all other servers 320, 330, and 340 in the same distribution point to pass their request rates back to server 310. Server 310 then compiles and analyzes the distribution point request rate in order to determine if monitoring should be graduated further. This approach does not designate any single server to perform distribution point monitoring. For example, if the server level threshold of the second server 320 within the distribution point is exceeded, the second server 320 can then request the other distribution point servers 310, 330, and 340 to send their request rates to the second server 320 for determining the aggregate distribution point request rate.

The alternative approach illustrated in FIG. 4 designates a first server 310 within a distribution point to compile the aggregate request rate for that distribution point. All other servers 320, 330, and 340 within the distribution point report their request rates to the first server. The other servers 320, 330, and 340 can be configured to periodically (e.g., every 10 seconds) report the request rates to the first server 310 or can be configured to send the request rates upon request by the first server 310. Whenever the server level threshold at one of the second, third, or fourth servers 320, 330, and 340 is exceeded, these other servers 320, 330, and 340 can query the aggregate distribution point request rate from the first server 310. Alternatively and as shown in FIG. 4, these other servers 320, 330, and 340 can notify the first server 310 that their server level threshold has been exceeded and that the first server 310 should graduate monitoring to the distribution point level. At this point, the first server 310 takes over the distribution point threshold monitoring. The difference in the two approaches is that in FIG. 4, distribution point threshold monitoring and further monitoring escalation is performed by the designated servers 310 regardless of which server had its server level threshold exceeded, whereas in FIG. 3, distribution point threshold monitoring and further monitoring escalation is performed by the server where the server level threshold was exceeded.

In any case and with reference back to process 200, the analysis at the distribution point level continues (at 240) for a specified duration or until the request rate at the distribution point exceeds the distribution point level threshold that is configured for that distribution point. The specified duration can be a timed interval or can expire when the request rate at the server where the server level threshold was exceeded falls back below the server level threshold. Should the specified duration expire, the process reverts back to step 210. However, should the aggregate request rate at the distribution point exceed the distribution point level threshold, the process again graduates the monitoring, this time to the global level. As a result, the process begins analyzing (at 250) the request rate across all distribution points of the distributed platform. As before, if the distribution point level threshold exceeded is particular to specific content, URL, domain, IP address block, etc., the analysis at the global level determines the request rate for that specific content, URL, domain, IP address block, etc. across the distributed platform.

In some embodiments, global request rate monitoring is initiated by the server identifying that the distribution point level threshold has been exceeded. This server will request the request rates from all other distribution points of the distributed platform. To do so, the server is configured with addressing of at least one server in each distribution point that is selected (deterministically or otherwise) to compile and pass back the aggregate request rate for its distribution point back to the requesting server. With reference back to FIG. 4, each distribution point has a particular server compiling request rates for its respective distribution point and further communicating the distribution point request rate to other distribution points upon request.

The monitoring at the global level continues (at 260) for a specified duration or until the request rate across the distributed platform exceeds the global level threshold. Again, the specified duration can be a timed interval or can expire when the request rate at the distribution point where the distribution point level threshold was exceeded falls back below that threshold. Should the specified duration expire, the process reverts back to step 240. Process 200 identifies the distributed platform to be potentially under attack when the aggregate request rate across the distribution platform exceeds the global threshold. In response, process 200 invokes and escalates attack protections to prevent performance degradation. Specifically, the process directs (at 270) each of the servers, or at least the servers under attack, to perform a first attack protection in response to global request rates exceeding the global threshold. The first attack protection causes the distributed platform servers to perform a specific set of operations on incoming requests. Specifically, the first attack protection involves a set of actions for reducing the global request rate back below the global threshold.

The process then continues to monitor (at 280) global request rates. When global request rates fall back below the global level threshold, the process reverts back to step 240. However, should the global request rates continue to exceed the global level threshold and/or increase to exceed a second global level threshold, process 200 escalates the attack protections to more aggressively and effectively reduce request rates. For example, if after ten seconds of performing the first attack protection, the global request rate does not fall back below the global level threshold, the process escalates the attack protections. As another example, if the global request rate exceeds a first global level threshold but not a second global level threshold, then the process directs the servers to perform the first attack protection. If however, the global request rate exceeds both the first and second global level thresholds, the process escalates the attack protections. Process 200 escalates the attack protections by directing (at 290) each of the servers, or at least the servers under attack, to perform a second attack protection. In some embodiments, the second attack protection is more effective at limiting request rates than the first attack protection. Examples of attack protections with different effectiveness are described below. Additional attack protections can be defined and triggered through additional global level thresholds should the global request rates continue to increase and distributed rate limiting needs to further scale the attack protections in return. Additional attack protections can also be defined and triggered should global request rates continue to exceed the global level threshold for different lengths of time.

Figure 5:
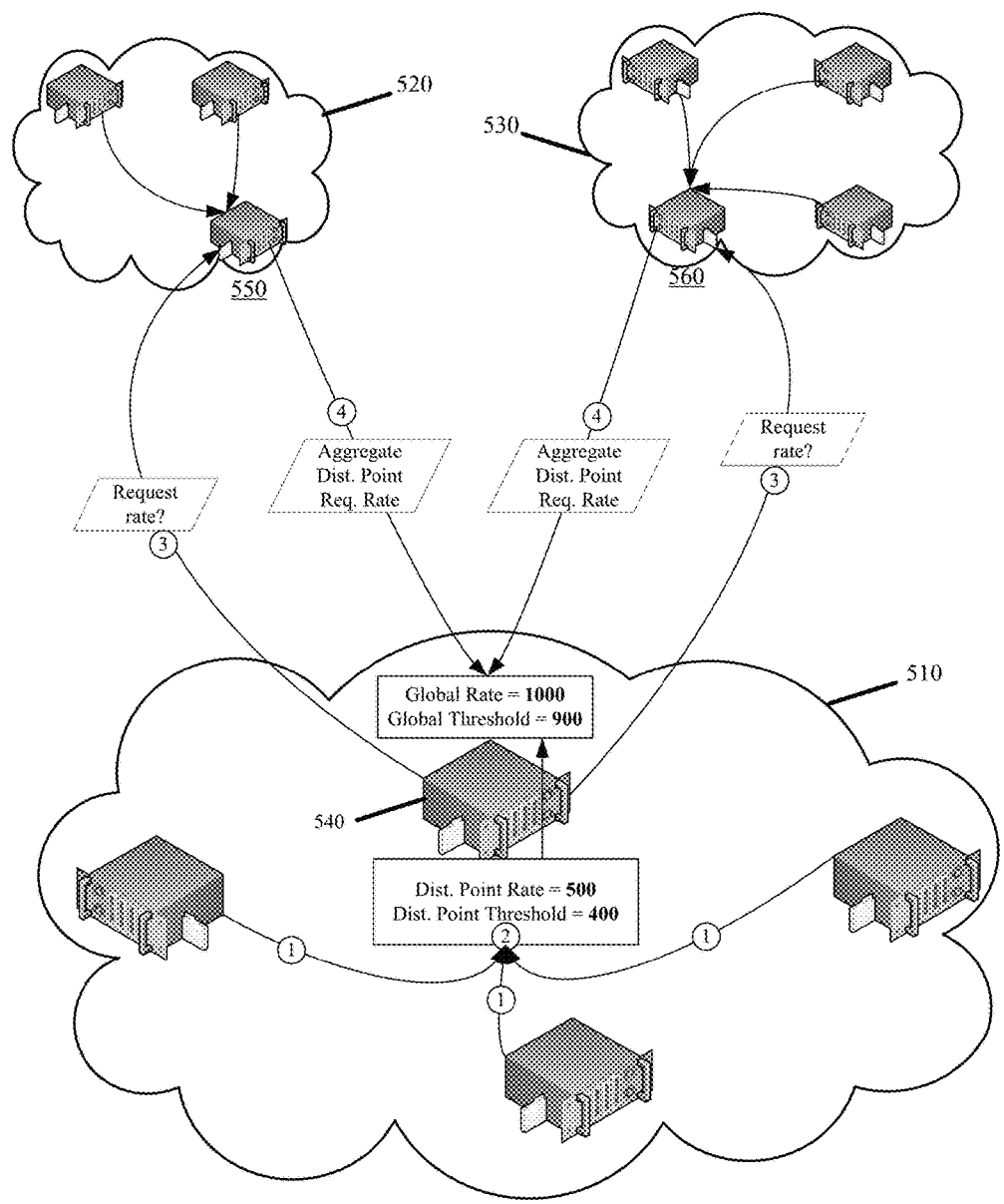

FIG. 5 conceptually illustrates global request rate monitoring in accordance with some embodiments. The figure depicts different distributed platform distribution points 510, 520, and 530. Each distribution point contains multiple servers. One server within each distribution point compiles request rates from all servers in the same distribution point and generates an aggregate request rate for that distribution point. In this figure, server 540 in distribution point 510, server 550 in distribution point 520, and server 560 in distribution point 530 analyze request rates for their respective distribution points. Each of these servers also participates in global request rate monitoring.

When the distribution point level threshold at distribution point 510 is exceeded, designated server 540 requests and receives request rates for distribution point 520 from server 550 and for distribution point 530 from server 560. From the aggregate distribution point request rates, server 540 identifies whether the global level threshold has been exceeded. Servers 550 and 560 can also initiate global request rate monitoring and request aggregate request rates from the other distribution points when the distribution point level threshold at their respective distribution point is exceeded.

Figure 6:
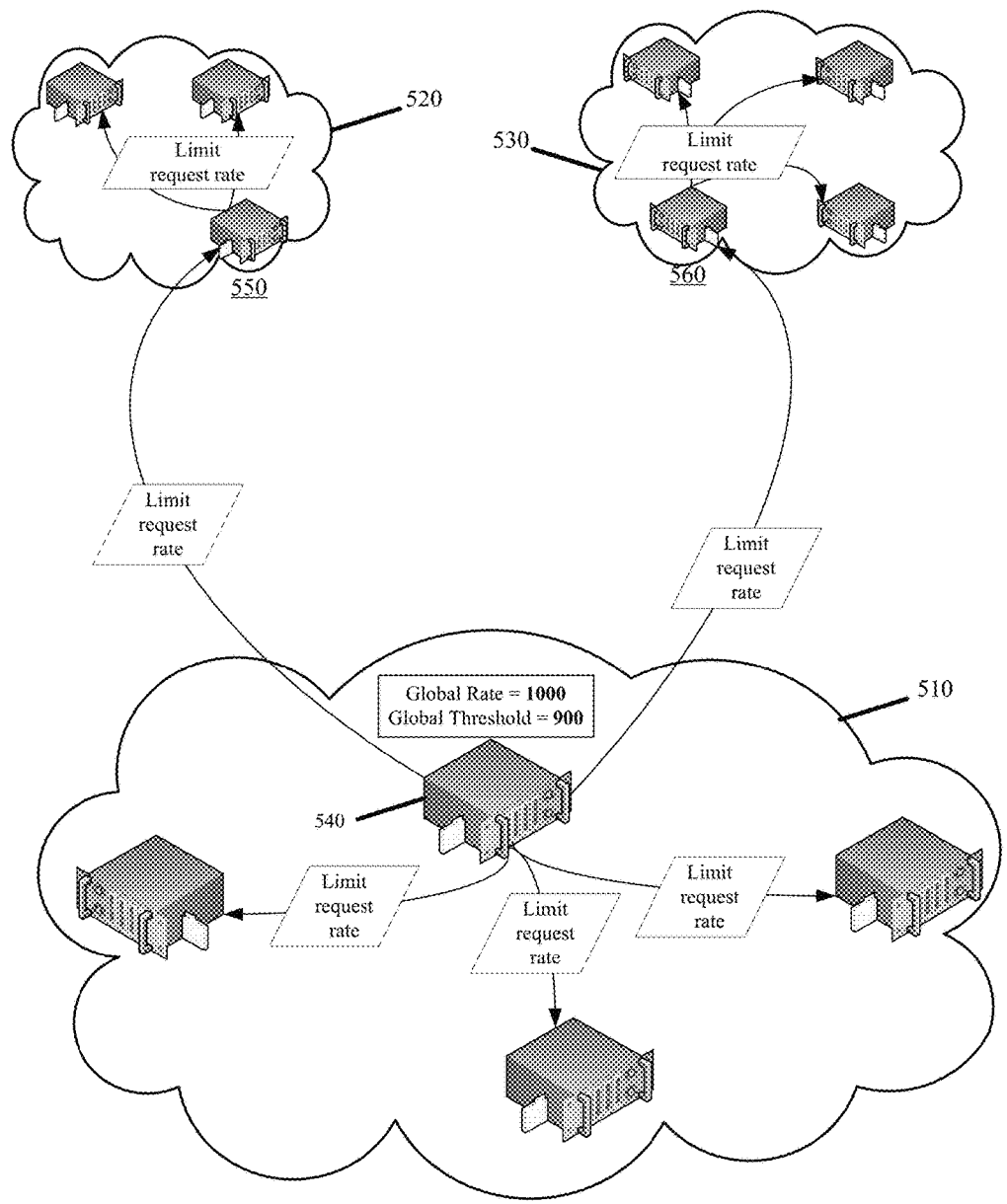
FIG. 6 illustrates the attack protection escalation in accordance with some embodiments.

FIG. 6 illustrates the attack protection escalation in accordance with some embodiments. In this figure, the global request rate exceeds the global threshold. Server 540 in distribution point 510 identifies that the global threshold has been exceeded. In response, server 540 escalates attack protection by directing the servers within its distribution point 510 to perform a specific attack protection. Server 540 also instructs server 550 of distribution point 520 and server 560 of distribution point 530 to perform the specific attack protections within their respective distribution points 550 and 560. Servers 550 and 560 then fan out the attack protection messaging to the other servers operating within their own respective distribution points so that the attack protection is executed by all distributed platform servers.

The distributed platform servers perform the attack protection for a period of time, which in some embodiments is specified by server 540 as an expiration parameter that is passed along with the messaging to commence the attack protection. At or before expiration of the attack protection, server 540 monitors global request rates by aggregating request rates from the other distribution points. Should the request rates continue to exceed the global threshold or exceed a second global threshold, server 540 could direct the distributed platform server to maintain performing the attack protection or direct the servers to perform a different attack protection that is more effective at limiting request rates.

Since the distributed rate limiting is a decentralized methodology, process 200 can be performed by any distribution point server within the distributed platform. Any distribution point server can therefore take initiative and graduate the monitoring from the server level to the distribution level. Similarly, any server or any particular designated server within a distribution point can further graduate the monitoring to the global level and instruct the other distribution point servers across the distributed platform to take remedial action against an attack.

The distributed rate limiting embodiments are implemented using specialized and secure server-to-server messaging. The messaging is used to signal graduating the monitoring and to further signal execution of the one or more attack protections. In some embodiments, each distribution point server is configured with addressing (e.g., IP address or virtual IP address) that uniquely identifies each of the other distribution point servers operating within the distributed platform. In some other embodiments, each distribution point server is configured with addressing of the servers within the same distribution point and a different address for communicating with a particular server from each of the other distribution points. The particular server is the server within a distribution point selected to report on distribution point request rates and to distribute attack protection messaging received from other distribution points across to the other servers that operate within the same distribution point as the particular server. The particular server can be automatically selected. In some such embodiments, the particular server is automatically selected to be the first server within the distribution point with request rates that exceeds a server level threshold.

Using the configured addressing, a distribution point server can instruct other distribution points or other distribution point servers to report their request rates in the graduated manner set forth by FIGS. 3-6. The messaging can granularly define which request rates other servers are to report to a requesting server. Based on the messaging parameters, servers can report request rates resulting from one or more specific IP addresses, IP address blocks, IP subnets, AS numbers, geographic regions, or specific content or services as identified by domain name, URL, or other identifiers within user requests as some examples.

Using the configured addressing, a distribution point server can instruct other distribution points or other distribution point servers to perform attack protections. In some embodiments, the messaging identifies the desired attack protection that the receiving servers are to perform. The issuing server can change or escalate the protections using additional messaging should an attack continue or worsen.

In some embodiments, the attack protection messaging includes an expiration parameter. The expiration parameter specifies when execution of an attack protection should end. By including the expiration parameter, the issuing server need not follow-up and instruct the other servers to stop performing the attack protection when the attack threat is eliminated or removed. The servers simply stop performing the protections after expiration of the expiration parameter unless they are instructed again to continue or escalate the protections as a result of subsequent distributed rate limiting messaging. This approach automatically resolves the issue stemming from multiple distribution point servers issuing the same attack protection instruction at slightly different times. The receiving servers execute the first instruction as it arrives. The later arriving instruction is simply ignored upon recognizing that the server has already began executing the requested attack protection.

To prevent outside interference, the distributed rate limiting messaging for graduated monitoring and attack protections can be digitally signed by any distribution point server sending the message. The signature verifies that the message source is a trusted distribution point server of the distribution platform and not an unknown or untrusted machine. In some embodiments, the messaging can be sent to a multicast address that all the distribution point servers are configured to listen on when configured to perform distributed rate limiting in accordance with some embodiments.

As noted above, the distributed rate limiting embodiments allows servers the ability to escalate the attack protections should request rates continue to exceed the defined global threshold or when global request rates exceed different global thresholds. In some embodiments, attack protection escalation involves altering the scheme with which the distributed platform servers limit request rates.

A first attack protection scheme supported by the distributed rate limiting embodiments includes redirecting user requests back to the distributed platform. The redirection can be performed by issuing a HyperText Transfer Protocol (HTTP) 302 redirect message in response to the first issued request from each end user. The redirect message reduces request rates by avoiding processing of requests that do not follow the redirection. Thus, requests originating from bots or machines running attacking scripts that do not process the server response or are unable to do so will not be redirected by the issuing bot or machine and will therefore not be processed by the distribution point servers. Legitimate users submitting requests from any device or application running a standard protocol stack will still be able to receive their requested content or services with only the added delay of the redirection.

A second attack protection scheme supported by the distributed rate limiting embodiments and that is more effective in limiting request rates than the first attack protection includes submitting the redirect via JavaScript. This second attack protection scheme filters out requests from bots that do not have any script execution abilities.

A third attack protection scheme supported by the distributed rate limiting embodiments that is still more effective than the second attack protection includes severing connections in response to first requests issued by users. The connection severing requires the users to reestablish the connection with the server before resubmitting their requests. This requires more effort and time from the requestors, and therefore slows the rate at which the requestors can submit requests to the server. Slowing the request rate coming from bots or even legitimate users diminishes the ability for an attack to overrun the distributed platform.

A fourth attack protection scheme supported by the distributed rate limiting embodiments involves sending messaging in response to first issued requests with the messaging identifying the distributed platform as being unavailable for a temporary period of time. For example, the message may identify the distributed platform as unavailable for five seconds, causing legitimate users to reissue their requests after five seconds. In some embodiments, this fourth attack protection scheme is implemented using HTTP 503 messages.

A fifth attack protection scheme supported by the distributed rate limiting embodiments involves sending messaging in response to first issued requests with the response messaging containing a computational problem that requires computational effort from the requestors. Specifically, if a request does not include an answer to the computational problem, the response message with the computation problem is sent back to the requestor. If the request includes a correct answer to the computation problem, the server will fulfill the request and return the requested content or service. If the request includes an incorrect answer to the computational problem, the server can either drop the request, resubmit the computational problem, or take other blocking action.

These are examples of some attack protection schemes supported by the distributed rate limiting embodiments. Accordingly, other attack protection schemes may be integrated and used as part of the attack protection escalations.

Some embodiments permit definition of custom attack protection schemes. The custom attack protection schemes allow distributed platform customers the ability to configure the protections that are invoked when request rates for specific customer content exceed thresholds the customer or distributed platform has set for that specific customer content. In some embodiments, custom attack protection definition involves receiving a script from a customer. The script is deployed to the distribution point servers. The servers execute the script when request rates for that customer's content or services exceed a designated threshold. The script controls how the servers respond to and limit incoming user requests directed to the customer's content or services.

The attack protection messaging can invoke different behavior from the distribution point servers. In some embodiments, the server issuing the attack protection messaging can define the amount of traffic that is subject to the attack protections. For instance, the issuing server can designate that 50% of all incoming traffic should be subjected to the attack protection. This is one manner in which the issuing server can control the amount with which request rates should be reduced. Another manner is simply to specify the desired reduction as part of the attack protection messaging. The receiving servers then subject all traffic to the attack protection until the specified reduction in request rates is achieved.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

FIG. 7 illustrates a computer system or server with which some embodiments are implemented. Such a computer system includes various types of computer-readable mediums and interfaces for various other types of computer-readable mediums that implement the various methods and machines described above (e.g., distribution point server). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for defending against network attacks, the method comprising:
   providing a distributed platform comprising a plurality of distribution points with each distribution point comprising a plurality of servers, each server tracking a request rate at that server independently prior to initiation of attack protections;
   receiving requests for content at a particular server at a first rate in excess of a single server request rate threshold, wherein the particular server is one of the plurality of servers operating from a particular distribution point of the plurality of distribution points;
   providing the particular server control over attack response of the distributed platform in response to the particular server receiving the requests at the first rate in excess of the first single server request rate threshold, said providing comprising configuring the particular server with monitoring attack propagation from the particular server across the particular distribution point based on a second distribution point request rate threshold, and monitoring attack escalation from the particular distribution point across the plurality of distribution points based on a third distributed platform request rate threshold, and wherein the third distributed platform request rate threshold is greater than the second distribution point request rate threshold, and the second distribution point request rate threshold is greater than the first single server request rate threshold;
   initiating from the particular server, attack protections at each other server of the plurality of servers operating in the particular distribution point in response to said providing the particular server control over the attack response, each server of the plurality of servers operating in the particular distribution point providing a request rate at that server to the particular server in response to initiating the attack protections from the particular server;
   propagating by the particular server, the attack protections to the plurality of servers at each other distribution point of the plurality of distribution points in response to the different rates at the plurality of servers of the particular distribution point totaling a second rate in excess of the second distribution point request rate threshold, each server at each other distribution point of the plurality of distribution points providing a request rate at that server to the particular server operating in the particular distribution point in response to propagating the attack protections; and
   activating from the particular server, the attack protections across the plurality of servers in the plurality of distribution points in response to (i) the requests arriving across the plurality of servers of the plurality of distribution points at a third rate in excess of the third distributed platform request rate threshold, (ii) the different rates at the plurality of servers of the particular distribution point totaling the second rate in excess of the second distribution point request rate threshold, and (iii) the particular server receiving the requests at the first rate in excess of the first single server request rate threshold; and
   blocking each first request from each requestor arriving at each server at the plurality of distribution points in response to said activating the attack protections from the particular server, said blocking comprising at least one of redirecting the first request, dropping the first request, or responding with a computational problem having a solution that withdraws said blocking.

2. The method of claim 1 further comprising compiling at the particular server in response to said propagating, the third rate based on different rates at which the plurality of servers from the plurality of distribution points receive the requests.

3. The method of claim 2, wherein said propagating comprises signaling at least one server from each specific distribution point of the plurality of distribution points to report a rate at which the plurality of servers of the specific distribution point receive the requests.

4. The method of claim 1, wherein said activating of said attack protections comprises passing a message from the particular server to each of the plurality of distribution points, said message invoking said blocking by each server within the plurality of distribution points.

5. The method of claim 1 further comprising serving the content in response to a redirected second request for the content from a common requestor.

6. The method of claim 1 further comprising serving the content in response to a second request from a particular requestor providing a correct solution to the computational problem, and dropping the second request from the particular requestor or submitting a different second computational problem in response to the second request providing an incorrect solution to the computational problem.

7. A method for responding to an attack on a distributed platform comprising a plurality of distribution points with each distribution point of the plurality of distribution points comprising a plurality of servers for responding to requests for content or services, the method comprising:
   receiving a plurality of requests for a plurality of content from a plurality of different clients over a digital network at the plurality of servers of the plurality of distribution points;
   detecting initiation of a network based attack at a particular server of a particular distribution point based on (i) a rate of requests for particular content at the particular server exceeding a first single server request rate threshold or (ii) requests from a set of the plurality of users exceeding the first single server request rate threshold;
   configuring the particular server with a first set of addresses of each other server of the plurality of servers of the particular distribution point and a second set of addresses of at least one server in other distribution points of the plurality of distribution points;
   invoking an initial response to said network based attack from other servers of the plurality of servers within the particular distribution point based on signaling to the first set of addresses originating from the particular server in response to said detecting the initiation of the network based attack at the particular server;

invoking an escalated response to said network based attack from the plurality of servers within other distribution points of the plurality of distribution points based on signaling to the second set of addresses originating from the particular server in response to (i) an aggregate rate of requests for said particular content at the particular distribution point exceeding a second distribution point request rate threshold for the particular content or (ii) requests from the set of users to the plurality of servers of the particular distribution point exceeding the second distribution point request rate threshold; and modifying the escalated response by activating first request blocking at each server of the plurality of servers in the plurality of distribution points in response to a request rate for said particular content across the plurality of distribution points or a number of requests from the set of users across the plurality of distribution points exceeding a third distributed platform request rate threshold, wherein said first request blocking comprises each server operating from the plurality of distribution points redirecting requests for said particular content or requests from the set of users during a first time, and sending computational problems in response to requests for the particular content or requests from the set of users during a second time in response to exceeding the third distributed platform request rate threshold after the first time and said redirecting.

8. A method comprising:

serving over a first time, from each of a plurality of servers in a plurality of distribution points of a distributed platform, particular customer content in response to requests for the particular customer content arriving at each server below a first single server request rate threshold; and blocking at each server in the plurality of distribution points over a later second time, each first request directed to the particular customer content in response to (i) a first request rate for the particular customer content at a particular server in a particular distribution point exceeding the first single server request rate threshold, (ii) a second request rate for the particular customer content at the particular distribution point exceeding a different second distribution point request rate threshold, and (iii) a third request rate for the particular customer content across the plurality of distribution points exceeding a different third distributed platform request rate threshold, wherein the third distributed platform request rate threshold is greater than the second distribution point request rate threshold, and the second distribution point request rate threshold is greater than the first single server request rate threshold, and wherein blocking each first request comprises at least one of redirecting the first request, dropping the first request, or responding with a computational problem having a solution that withdraws said blocking.

9. The method of claim 8 further comprising detecting the second request rate for the particular customer content at the particular distribution point in response to the first request rate for the particular customer content at the particular server exceeding the first single server request rate threshold.

10. The method of claim 9 further comprising detecting the third request rate for the particular customer content across the plurality of distribution points in response to the second request rate for the particular customer content at the particular distribution point exceeding the second distribution point request rate threshold.

11. The method of claim 8 further comprising changing the first request blocking from one of the redirecting, dropping, and responding with the computational problem to a different one of the redirecting, dropping, and responding with the computational problem in response to the third request rate for the particular customer content across the plurality of distribution points not falling below the third distributed platform request rate threshold after said second time interval.

12. The method of claim 8 increasing difficulty of the computation problem in response to the third request rate for the particular customer content across the plurality of distribution points not falling below the third distributed platform request rate threshold after said second time interval.

13. The method of claim 8 further comprising configuring a plurality of customer attack definitions at each server in the plurality of distribution points, each customer attack definition being associated with different customer content and setting the first single server request rate threshold, the second distribution point request rate threshold, and the third distributed platform request rate threshold with different threshold values specified for the customer content associated with the customer attack definition.

14. The method of claim 13 further comprising selecting a particular customer attack definition from the plurality of customer attack definitions at each server in the plurality of distribution points in response to each server receiving requests for the particular customer content.

15. The method of claim 14 further comprising setting values for the first single server request threshold, the second distribution point request rate threshold, and the third distributed platform request rate threshold at each server based on said selecting the particular customer attack definition.

16. The method of claim 14 further comprising activating said blocking at the later second time, in response to (i) the first request rate exceeding a first customer specific value for the first single server request rate threshold from the particular customer attack definition, (ii) the second request rate exceeding a second customer specific value for the second distribution point request rate threshold from the particular customer attack definition, and (iii) the third request rate exceeding a third customer specific value for the third distributed platform request rate threshold from the particular customer attack definition.

* * * * *